(12) United States Patent
Reeve

(10) Patent No.: US 6,314,092 B1
(45) Date of Patent: Nov. 6, 2001

(54) ROUTING IN A COMMUNICATIONS NETWORK

(75) Inventor: Stephen Reeve, St Edmuncs (GB)

(73) Assignee: British Telecommunications public limited company, London (GB)

(*) Notice: Subject to any disclaimer, the term of this patent is extended or adjusted under 35 U.S.C. 154(b) by 0 days.

(21) Appl. No.: 08/849,146

(22) PCT Filed: Nov. 30, 1995

(86) PCT No.: PCT/GB95/02803
§ 371 Date: Jun. 9, 1997
§ 102(e) Date: Jun. 9, 1997

(87) PCT Pub. No.: WO96/17458
PCT Pub. Date: Jun. 6, 1996

(30) Foreign Application Priority Data
Nov. 30, 1994 (EP) .................................. 94308836

(51) Int. Cl.⁷ ................ H01J 1/16; H01J 3/14; H04L 12/26; H04L 1/00
(52) U.S. Cl. .............. 370/351; 370/236; 370/238; 370/255; 370/400; 379/220
(58) Field of Search ................... 370/254, 255, 370/357, 400, 401, 402, 403, 389, 225, 238, 252, 392, 236

(56) References Cited

U.S. PATENT DOCUMENTS

| | | | |
|---|---|---|---|
| 4,905,233 | * 2/1990 | Cain et al. ................. | 370/94 |
| 4,974,224 | 11/1990 | Boone ........................ | 370/94.1 |
| 5,233,604 | * 8/1993 | Ahmadi et al. ............. | 370/60 |
| 5,317,566 | * 5/1994 | Joshi ........................... | 370/60 |
| 5,321,815 | * 6/1994 | Bartolanzo, Jr. et al. ... | 395/200 |
| 5,398,012 | * 3/1995 | Derby et al. ................. | 340/825.03 |
| 5,452,294 | * 9/1995 | Natarajan ................... | 370/54 |
| 5,590,119 | * 12/1996 | Moran et al. ............... | 370/225 |
| 6,097,727 | * 8/2000 | Peters ........................ | 370/400 |

FOREIGN PATENT DOCUMENTS

A0599764    6/1994   (EP) .

* cited by examiner

*Primary Examiner*—Wellington Chin
*Assistant Examiner*—M. Phan
(74) *Attorney, Agent, or Firm*—Nixon & Vanderhye P.C.

(57) ABSTRACT

A path between a selected first node and a selected second node is identified in a telecommunications network. A system cost is estimated for making a connection between the first node and the second node, a potential first intermediate note interconnectable from the first node is identified and a first set of systems costs are estimated from said first intermediate nodes to said second node. In addition, the second intermediate nodes connectable from the second node are identified and a second set of systems costs are estimated from the second intermediate nodes to the first node. On the basis of a comparison between the first set of systems costs and the second set of systems costs, between the first and second nodes, a starting node and a target node are selected.

16 Claims, 7 Drawing Sheets

ROUTING IN A COMMUNICATIONS NETWORK

FIELD OF THE INVENTION

The present invention relates to identifying a path between a selected first node and a selected second node in a communications network to provide routing in the network.

RELATED ART

Over recent years communications companies have increasingly provided their customers with an improved quality of service and an improved range of services due to the introduction of digital communications equipment. Thus the equipment that is found within network interconnection sites (trunk exchanges) and local service exchanges is largely digital. However, the connection between local service exchanges and network interconnection sites may consist of a variety of different technologies including copper coaxial cable, fibre optic cable, radio links and satellite links.

In order to take advantage of changing demands placed on a communications network, for example the changes in communications traffic density that occur throughout a daily cycle, digital communications equipment may be controlled to divert customer services dynamically, so taking advantage of the most economical route that may be available at a particular time during the day. Networks are known where diversion of communications traffic is performed automatically according to algorithms encoded at processor sites within each communications node.

A call made from a point A in a communications network to a point B in the same communications network may be made over a plurality of different paths. It is important for the particular path that is chosen to be that which is most economical at the time when the service is in use. A method is known where a service request message is distributed throughout the nodes of a system so that each intermediate node between points A and B receives the request message and transfers it on to every node to which it is connected. At some point, the node to which point B is connected will receive the request message. The first such message received will have encoded within it all the nodes through which it has passed on its journey from point A to B. Several messages will then arrive at the node nearest to point B subsequently; however, these will have arrived later in time and thus the list of nodes encoded within a request message received after a first request message describes a route which took longer to transmit the request message from the caller at A to the receiver at B. This is a typical example of how a network may effectively provide dynamic re-routing of calls and communications services with a high degree of efficiency. Other similar and more advanced methods for dynamic routing of communications services in a network are known, and are the subject of much current research.

A known disadvantage of this type of network is that the behaviour of the network under certain critical conditions can become unpredictable and even chaotic, possibly resulting in catastrophic failure of an entire communications network for a period of time. The network is difficult to simulate because the degree of complexity embodied by large numbers of distributed nodes taking part in dynamic routing can only be approximated roughly by a mathematical model.

A further disadvantage of this type of network is that a large proportion of the nodes within a communications network have to conform to a particular specification, i.e. hardware and software must precisely match the requirements for a particular type of node, and thus the phased introduction of this type of network is more difficult than the phased introduction of communications nodes which are monitored by one or several central network monitoring sites.

Centralised network monitoring requires considerable computing resources in order to ensure that efficient routing and re-routing of calls is performed dynamically, however. The restrictions imposed by the need to monitor a communications network centrally have typically resulted in the use of simple re-routing algorithms such as swapping services to predetermined less efficient routes when the most efficient route for a service is close to saturation of its channel capacity.

A further use for re-routing, whether in the distributed or centrally monitored type, is to circumvent cable failures. In a passive, centrally monitored network when a line failure is detected it is a common practice to re-route services over predetermined alternative paths.

In addition to dynamic routing requirements within an operational communications network, large industrial users of a communications network, for example a petroleum company or a bank, may require a direct digital connection between different company sites. In order to provide such a direct link, the communications provider will design an optimal route through the existing communications network taking advantage of the various technologies that may be available concerning the customer's needs. For a high reliability connection, a customer may specify that no radio links are to be used. Alternatively, the customer may specify that two lines should be provided over completely different routes, so that failure of one line for whatever reason is unlikely to coincide with failure of a second line.

Mixed technology communications networks may include communications nodes that may not be reconfigured by remote monitoring computers. In this event, the design of an optimal routing between geographically distinct customer sites frequently requires co-ordination between personnel and resources from a number of communications operators, or between divisions of a single larger communications provider. This results in a large degree of co-ordination and administration during the evaluation and design of the route. Furthermore, as there may be a number of different possible ways of providing a route between a given pair of customer sites, problems may arise when dealing with different company divisions along the route which may feel the need to compete against each other.

At a local level a particular type of route, for example coaxial cable, may appear to provide an advantage over other types of route, for example radio links. When seen within the context of the overall route, however, what may have been an advantage at a local level may turn out to be a disadvantage within the route as a whole. This may be due to the type of connections which may be made subsequently to the coaxial cable. Due to the cost of the administrative design process, it may not be cost efficient to perform an additional iteration of the design process, resulting in the provision of a route that is more expensive than that which may have theoretically been achieved.

SUMMARY OF THE INVENTION

According to a first aspect of the present invention there is provided a method of identifying preferred paths for traffic in a communications network, said paths having transmission links and reconfigurable switching nodes, comprising steps of; processing a first set of data relevant to paths starting from a first node to providing communication towards a second node; processing a second set of data relevant to paths starting from said second node to provide communication towards said first node; and comparing said sets of data to establish whether further steps to identify said preferred path should start from said first node or from said second node.

Preferably, said first set of data and said second set of data includes a number of potential links which could form part of a preferred path. Said comparison step may consist of comparing said number of links connected to each of said first node and said second node, such that the node having the fewer number of links is selected as starting node.

In a preferred embodiment, the further steps consist of a heuristic procedure to identify a third node connected via a link to either said first node or to said second node. Preferably, the third node may be treated as a new first node if connected to said first node or treated as a new second node if connected to said second node, whereafter the method is repeated to identify a preferred path between the new nodes.

The network, or nodes of the network, can then be configured, in a further step (h), to provide the identified path, as a preferred path, in response to a request for communications involving the original first and second nodes in the network.

According to a second aspect of the invention there is provided apparatus for identifying preferred paths for traffic in a communications network, said paths having transmission links and reconfigurable switching nodes, comprising; processing means for processing a first set of data relevant to paths starting from a first node to provide communication with a second node, and for processing a second set of data relevant to paths starting from said second node to provide communication with said first node; and comparing means for comparing said sets of data to establish whether further steps to identify said preferred path should start from said first node or from said second node.

Embodiments of the present invention provide a bi-directional process for identifying routes through a network without exhaustively searching for all potential solutions to the routing problem.

BRIEF DESCRIPTION OF THE DRAWINGS

The invention will now be described by way of example only, with reference to the accompanying drawings, in which.

DETAILED DESCRIPTION OF EXEMPLARY EMBODIMENTS

It should be noted that "telecommunications networks" may be referred to in this specification but that the invention should not be considered to be limited to any particular type of communications network by that terminology, such as networks which only connect telephones, but extends to other types of network perhaps carrying data between data processing points for instance.

Figure 1:
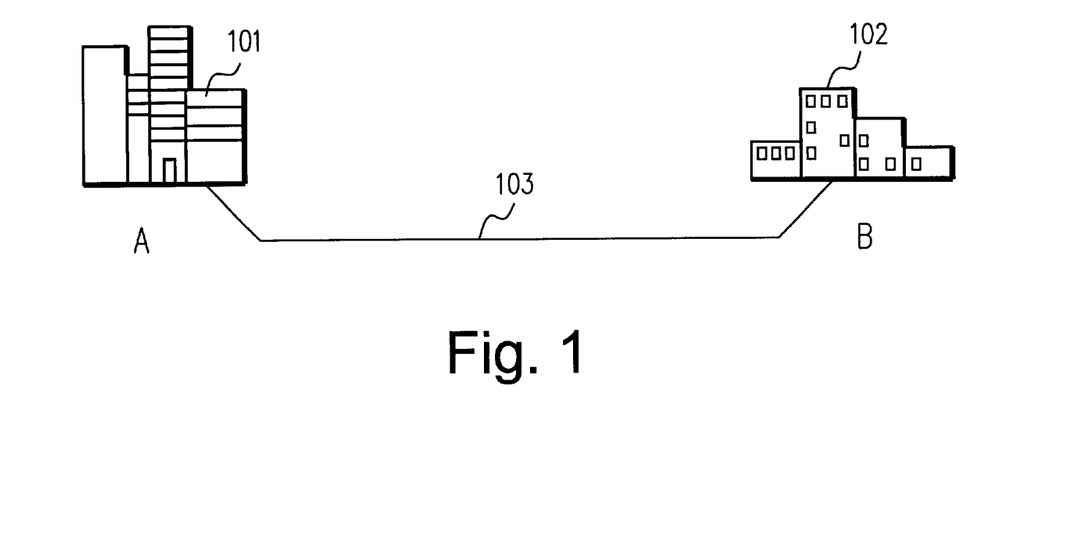
FIG. 1 shows a hypothetical connection between two offices of a company at different geographical locations.

A hypothetical connection is shown in FIG. 1 between two offices of a company at different geographical locations. An office 101 at geographical location A is connected to an office 102 at geographical location B via a telecommunications link 103, which is provided by a telecommunications provider. Thus FIG. 1 shows a typical example in which a customer requires a permanent route for a telecommunications channel to be set up on its behalf by a telecommunications provider.

Once a user, in this case a company with sites at locations A and B, requests a link of this type to be set up, the telecommunications provider will commence the process of evaluating the best route across its existing telecommunications network, so that it provides a service that is competitive and which utilises its resources efficiently.

Figure 2:
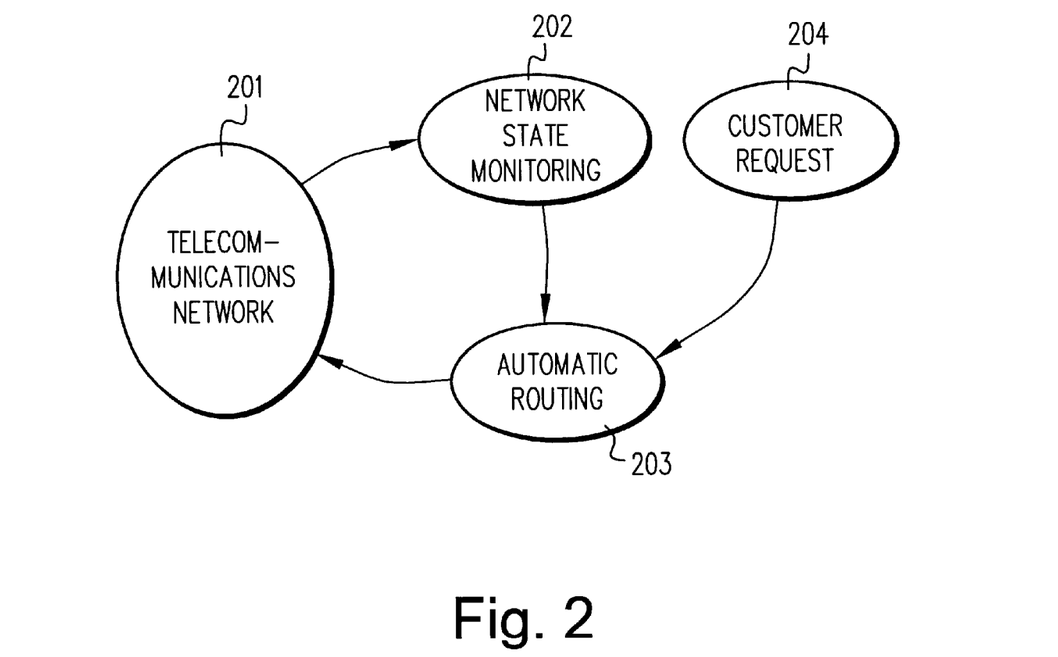
FIG. 2 illustrates key concepts applicable to any telecommunications network.

FIG. 2 shows the key concepts that operate within any telecommunications network. The telecommunications network 201 is subject to network state monitoring 202, which monitors the density of signal flow between communications nodes of a known capacity. In the event that the known capacity of telecommunications nodes or links begins to be approached by traffic that is being monitored, the network state monitor 202 generates a request for automatic re-routing as performed at process 203. This provides a series of controls for re-routing the telecommunications network ensuring that the capacity of telecommunications channels that are available on any particular link is not exceeded. Clearly it is necessary that the loop consisting of the telecommunications network 201, network state monitoring 202 and automatic re-routing 203 should be constructed such that automatic routing is always performed before capacity of a telecommunications link is breached. This can be done by providing high speed computerised monitoring. Alternatively it can be done by monitoring the telecommunications network over a longer time so that it is possible to anticipate problems well in advance.

There is an advantage in providing the highest speed possible for network state monitoring 202, as this means that a large percentage of the available communications network capacity can be used up without fear of overloading the network. The network state monitor 202 may also perform the task of identifying a link failure between telecommunications sites. This may result in the need for the re-routing of a call or service as quickly as possible and the notification of engineers so that the fault equipment may be repaired.

In addition to providing a constantly updated routing for a telecommunications network, a customer request 204 may specify a link, such as the one shown in FIG. 1, and automatic routing 203 may be used to set up such a link.

Figure 3:
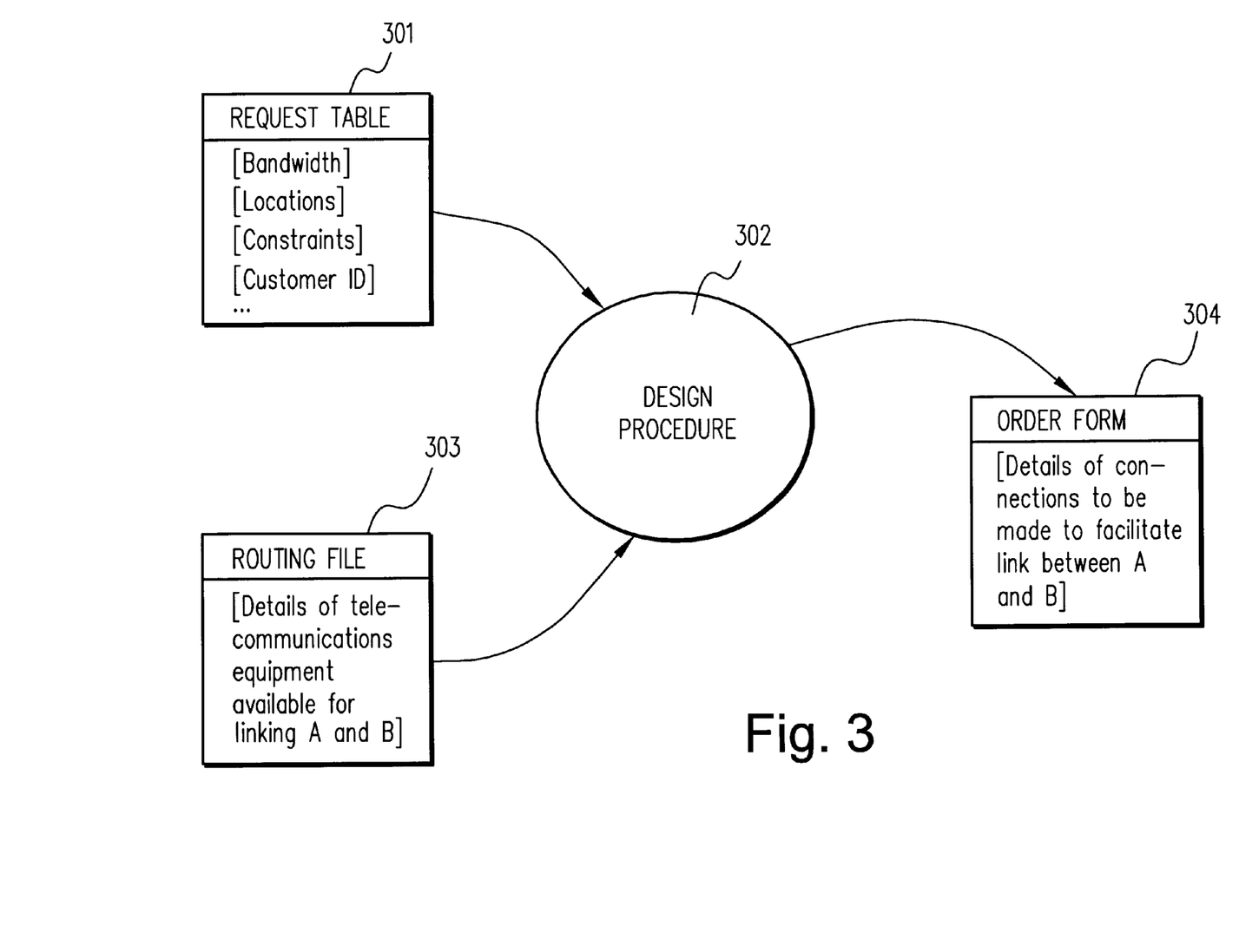
FIG. 3 details the operations performed by programs providing automatic routing.

FIG. 3 details the operations performed by the suite of programs providing automatic routing 203 shown in FIG. 2. The request table 301 is generated as a result of receiving a customer request 204 or information derived from network state monitoring 202. It includes information about the locations of the customer's sites, the bandwidth that is required, constraints on the type of equipment that is used, such as not radio, not microwave, and details about the customer. This ensures that the customer will be billed for expenses incurred in setting up and using the communications link.

The information in the request table 301 is provided as an input to the design procedure 302, which is a program of the type frequently referred to as an expert system. In addition to the information provided in the request table 301, the design procedure 302 requires information about existing telecommunications hardware, which is provided by the routing file 303. The routing file 303 includes details of all the telecommunications hardware that may be used to form the link between the sites at A and B. Thus, the design procedure 302 designs a communications link between the sites at A and B according to the customer specification information in request table 301, using the telecommunications hardware that is specified in the routing file 303. The output of the design procedure is an order form file 304 that contains details of all the changes that are needed at the various points in the telecommunications network in order to facilitate the requested communications link.

Figure 4:
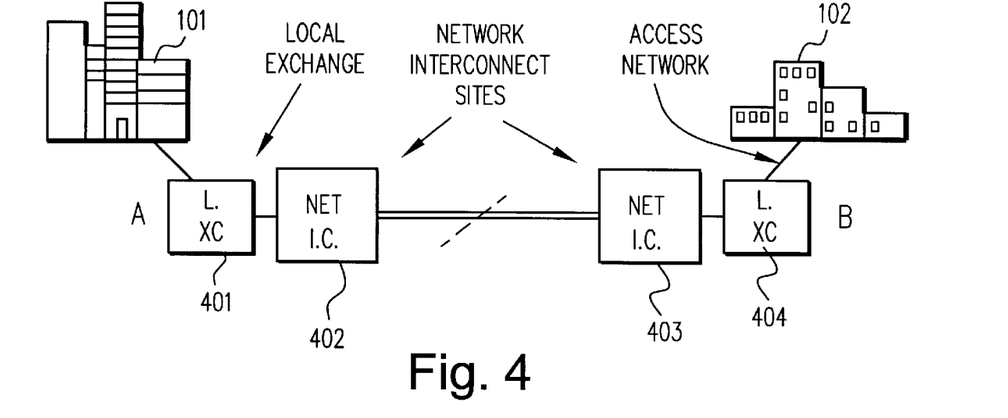
FIG. 4 shows further details of connections between sites.

FIG. 4 shows further details of the connection between sites A and B, site 101 at geographical location A has a direct digital connection to its local exchange 401. This direct digital connection is made over the local telecommunications access network. Local exchange 401 is connected to a first network interconnect site 402 over an outer core of the telecommunications network. The first network interconnect site (trunk exchange) 402 is connected over an inner core network connection to a second network interconnection site 403. The second network interconnection site 403 is connected to a second local exchange 404 near geographical location B. The company site 102 at geographical location B is connected to the second local exchange over the local telecommunications access network.

Figure 5A:
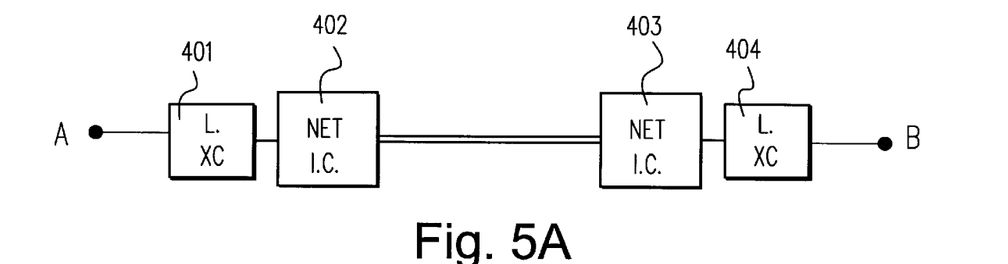
FIGS. 5A, 5B, 5C, 6A, 6B, 6C, 7, 8, 9A, 9B and 9C illustrate interconnectable nodes within a telecommunications network.

The first operation performed in the design procedure is the generation of live overall plans for connecting site A to site B. A first overall plan is shown in FIG. 5A, and this corresponds to the one shown in FIG. 4. The overall plan shown in FIG. 5A is generated by referring to individual plans for segments of the network, which in this case are the segment from local exchange 401 to network interconnect site 402, the network interconnect site 402 to the network interconnect site 403, and the network interconnect site 403 to the local exchange 404. Plans for the telecommunications hardware provided at each of these three segments are stored in the routing file 303, and the design procedure combines plans for each of the segments into an overall plan such as that shown in FIG. 5A.

Figure 5B:
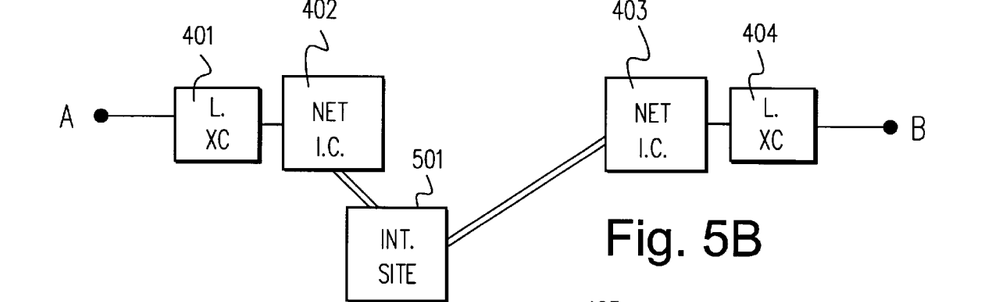
Figure 5C:
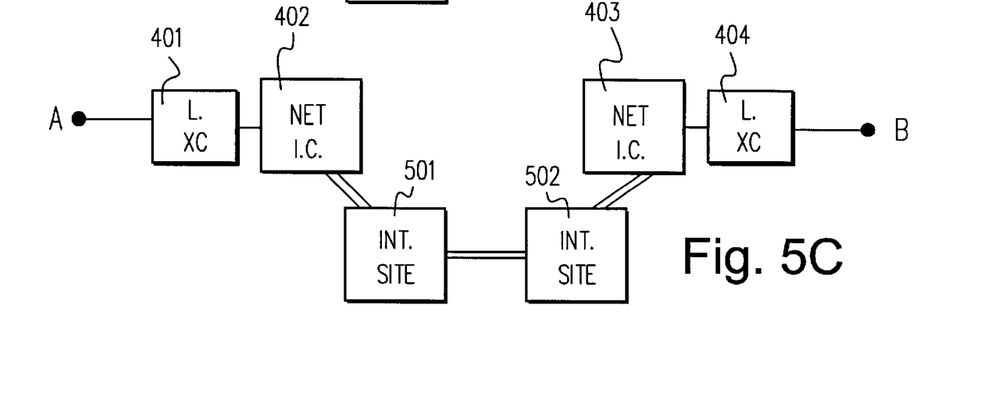

The five overall plans are generated according to a radial distance costing. Thus the overall plan shown in FIG. 5B represents a route that covers a greater geographical distance than that shown in FIG. 5A. The overall plan shown in FIG. 5C represents a route that covers a greater geographical distance than the one shown in FIG. 5B. Thus the overall plans shown in FIGS. 5A, 5B and 5C represent the top three of the five best overall plans for connecting site A to site B according to a radial distance costing.

A radial distance costing is one in which the cost of using a particular communications link is evaluated purely on the distance in a straight line between one telecommunications site, for example the first network interconnect site 402, and the second network interconnect site 403. Although this is a fairly arbitrary method of costing a route, this is not of particular importance as the purpose of generating the five overall plans in this way is to provide a prioritised list of possible routes that will subsequently be evaluated by a more stringent algorithmic method.

Having generated five overall plans in this way, the first three of which are shown in FIGS. 5A, 5B and 5C, the next step of the design procedure is to take each of the overall plans and to evaluate them on an individual basis, starting with the cheapest, until a successful communications route has been designed.

Figure 6A:
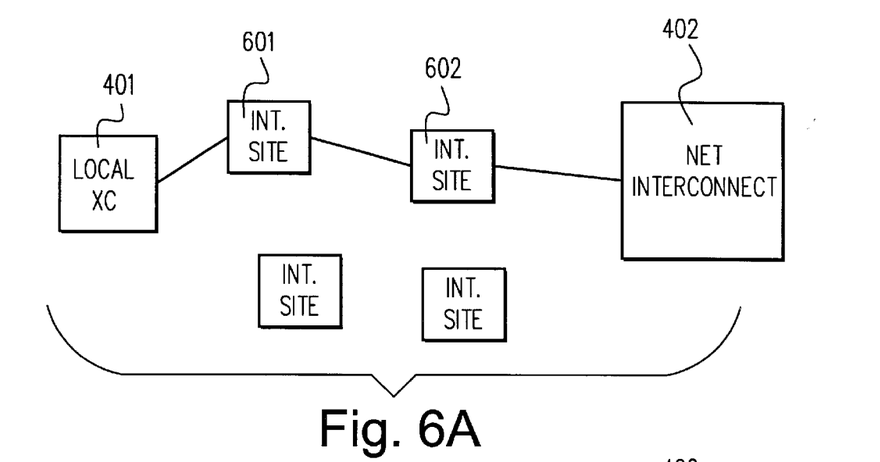

The first overall plan that would be considered by the design procedure is the overall plan shown in FIG. 5A. The connection from the local exchange 401 to the network interconnect site 402 shown in FIG. 5A in detailed in FIG. 6A. In FIG. 6A two intermediate telecommunications sites 601 and 602 are shown providing a path for the link between the local exchange 401 and the network interconnect site 402. It is possible that connections between each of the different telecommunications sites shown in FIG. 6A may be of a different type.

For a particular type of telecommunications link, for example an ISDN digital link, certain types of telecommunications connections or equipment may be unsuitable or preferable. Consequently, FIG. 6A shows only one of a number of different paths that may be used to provide the connection between the local exchange 401 and network interconnect site 402. Other paths between the local exchange 401 and the network interconnection site 402 are evaluated and prioritised according to the capacity and type of telecommunications link that is required. Alternative paths are shown in FIGS. 6B and 6C.

Thus for a particular type of link the design procedure will generate a number of possible paths between each of the major telecommunications sites in the overall plan being considered. Three different paths are shown in FIGS. 6A, 6B and 6C respectively, however a larger number of paths may be possible.

The routing file 303 contains a plan for each of the segments between the main telecommunications sites 401, 402, 403 and 404; for each of these segments a list of possible paths is generated, prioritised according to restrictions imposed on the link by the type of telecommunications equipment that is available.

Figure 6B:
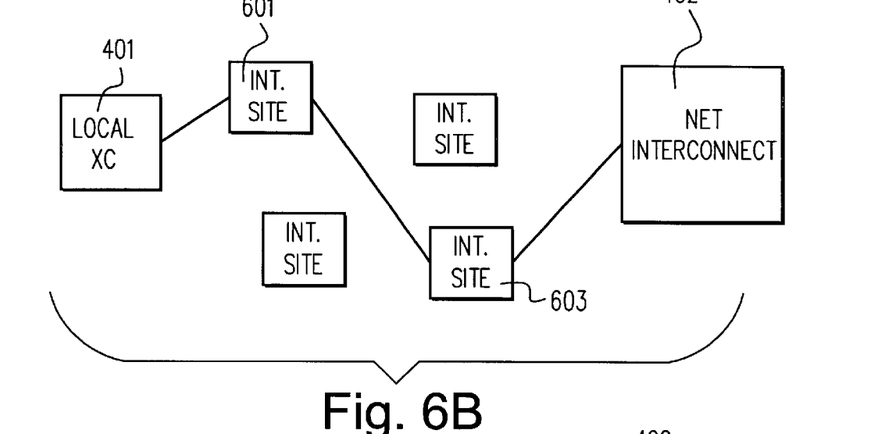
Figure 6C:
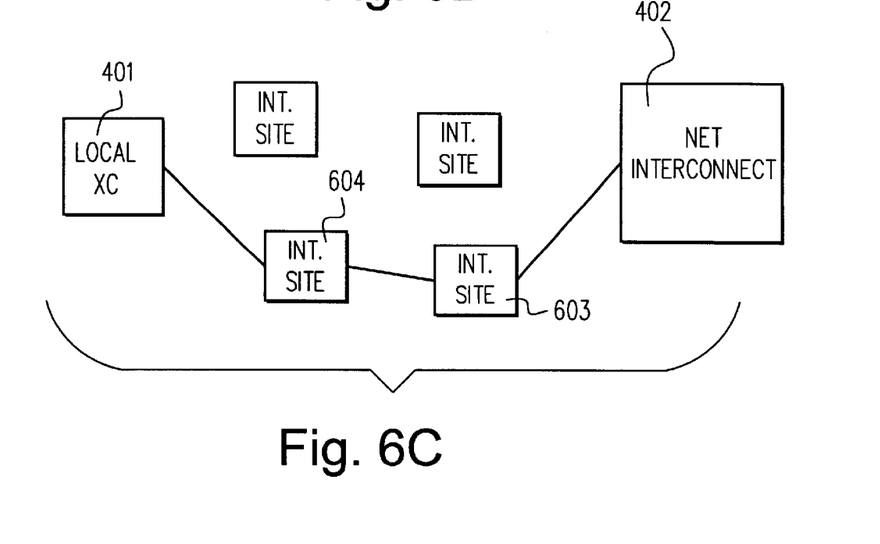

The path shown in FIG. 6B represents the path having the second most efficient series of connections between the local exchanges 401 and 402, with the telecommunications link provided via additional minor telecommunications sites 601 and 603. FIG. 6C shows the third most efficient connection between the local exchange and the network interconnect site, with the link passing through telecommunications sites 604 and 603. Thus FIGS. 6A, 6B and 6C represent a prioritised list of the three most efficient connection paths between the local exchanges 401 and network interconnect site 402. Additional paths may be possible, dependent on the capacity and design of telecommunications equipment available at each of the telecommunications sites.

Thus a number of possible paths for connecting the sites in the overall plan are generated. A first attempt to connect A to B will be made using the first "most efficient" path in each of the lists of paths for each corresponding segment of the overall plan. It is possible that an attempt to make the connection from A to B may fail using one of the first paths. When this happens the path in which the connection was unable to be made is replaced by another path from the list of possible paths for that segment. In this way a plurality of permutations of the paths for each of the segments of which the overall plan is comprised, may be tested until a successful link is established.

It is possible to set up a plurality of routes for connecting two sites, for example providing a first route using the path shown in FIG. 6A and a second route shown in FIG. 6C. This provides an important safeguard, commonly referred to as "separacy". Separacy ensures that in the event of a first telecommunications link failing, it is highly unlikely that the same cause of failure will cause a second telecommunications link to fail. Thus it is possible that more than one of the paths may be used as a part of a design for a route.

Figure 7:
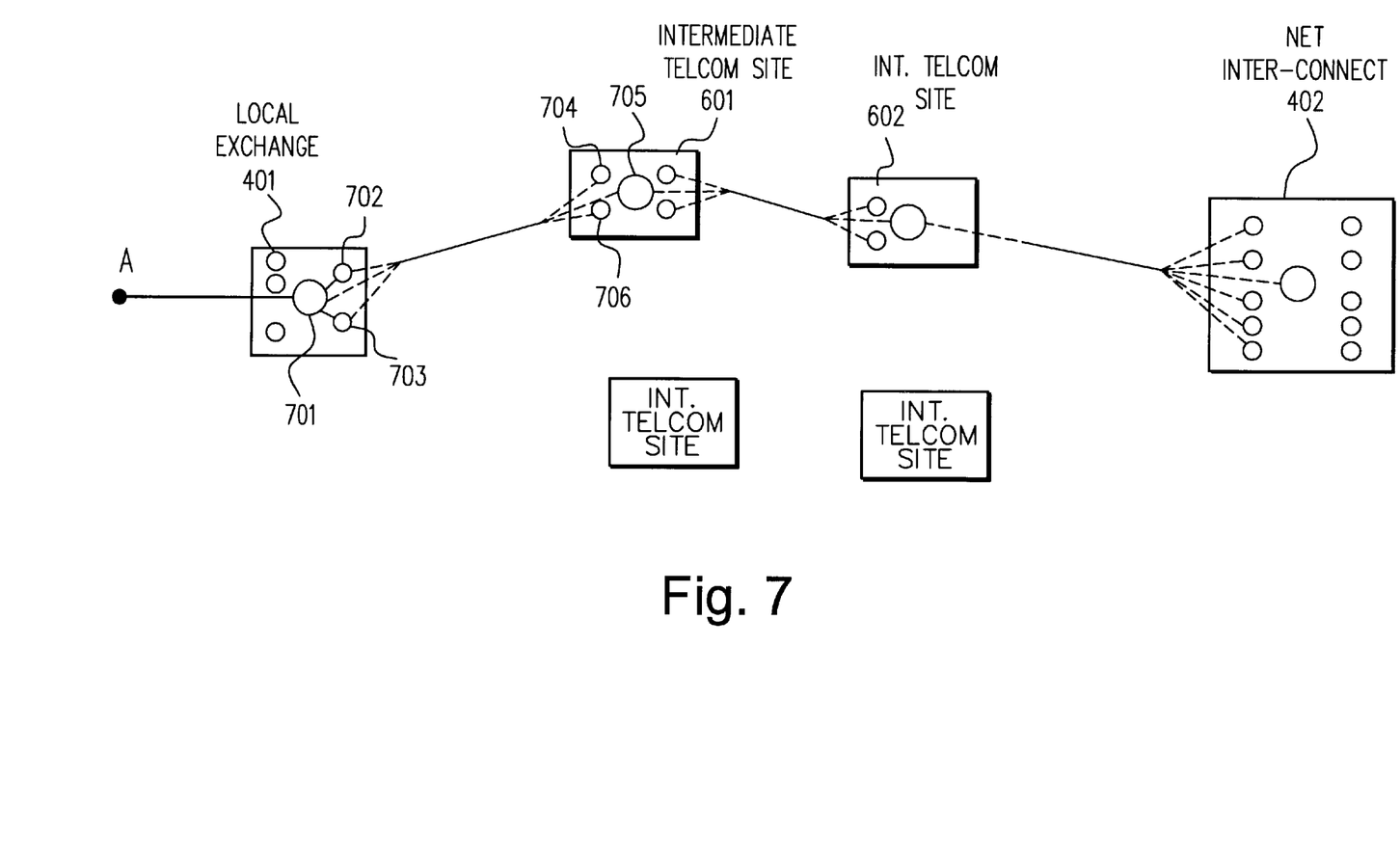

In FIG. 7 the connections comprising the path shown in FIG. 6A are shown in detail. Each of the telecommunications sites 401, 601, 602 and 402 has a plurality of connectable telecommunications nodes. The local exchange 401 may connect directly to the intermediate telecommunications site 601 or to a digital distribution frame 702 or 703 that is internal to the exchange building. The intermediate telecommunications site 601 also includes a main telecommunications node 705 and a plurality of digital distribution frames 704 and 706 that are connectable to the local exchange 401. Thus there are three possible bi-directional links to the local exchange 401 that may connect to the intermediate telecommunications site 601 by one of three different possible connections. Thus there are a total of nine different possible ways of connecting the local exchange 401 to the intermediate telecommunications site 601. Each of the different possible routes that the link may take in a given path are evaluated by careful weighting of several factors, including type of equipment used, link capacity, cost, distance and so on. Designing the specific connections used to implement the path shown in FIG. 7 requires a progressive intelligent search of the variety of possible connections that may be made.

Figure 8:
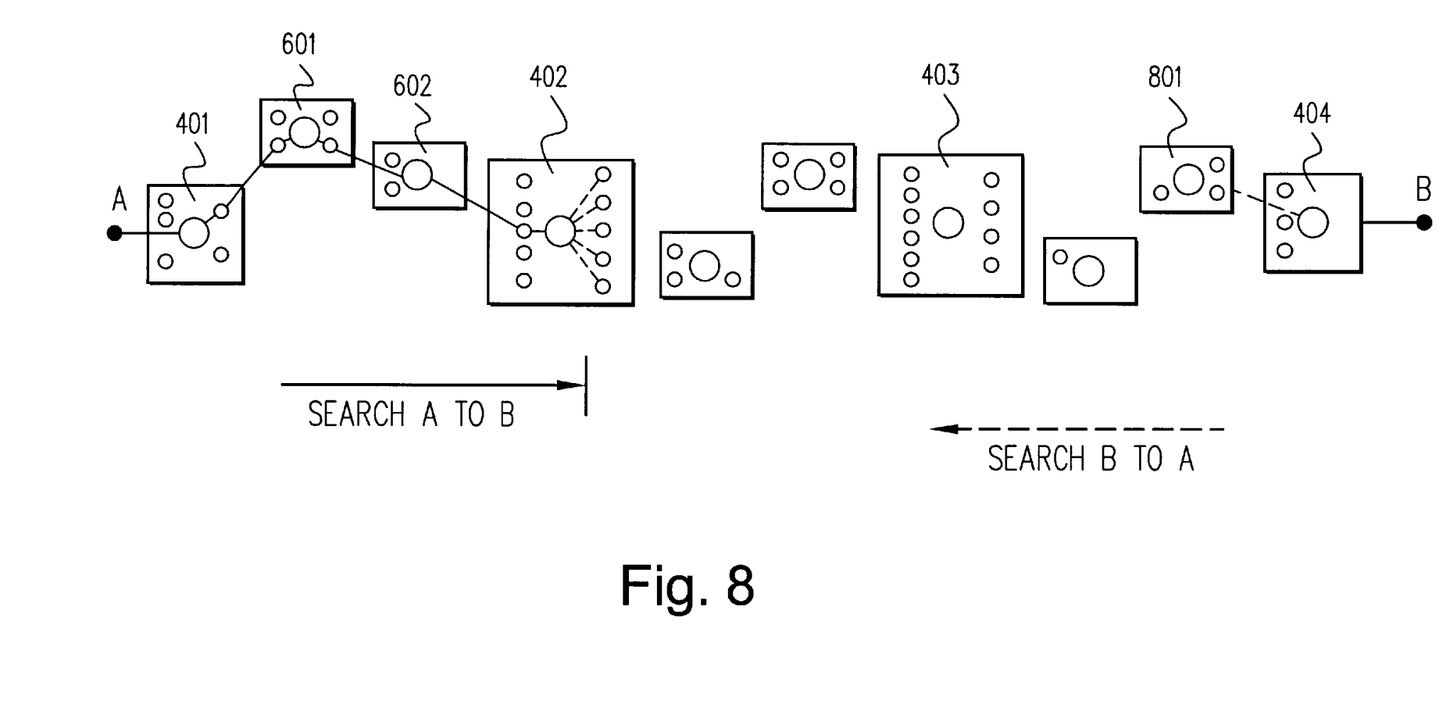

All the telecommunications nodes that are used in linking site A and site B are shown in FIG. 8. The connections that would be made after a partially complete iteration of the intelligent algorithm are shown. This establishes the cheapest and most efficient route for the link across the combined paths.

Thus, the system is arranged such that preferred paths are identifed for traffic in the network in which the network has transmission links and configurable switching nodes. The first set of data is processed consisting of a number of links starting from a node to provide communication to a second node. Similarly, the number of links present starting from the second node is processed which in turn may provide communication to the first node. These two sets of data are then compared, that is to say, the number of links present from the first node is compared with the number of links from the second node to establish whether further steps to identify the preferred path should start from the first node or from the second node. It is desirable to allow subsequent processing to be given the largest possible target to aim for while performing iterations. Consequently, the further processing steps are initiated from the node having the fewest number of links, thereby providing the largest number of links at the target end.

When the intelligent search algorithm is first initiated, it begins by evaluating the number of possible connections that may be made between the first telecommunications site, which is the local exchange 401, and the next telecommunications site in the path for that segment, which is the intermediate telecommunications site 601.

The number of possible ways of connecting these two sites 401 and 601 is evaluated, and in this case the number of permutations is 9. A similar evaluation is then applied to the local exchange 404 nearest to site B, with respect to the first intermediate telecommunications node 801 moving from the local exchange 404 in the direction of the local exchange 401. In this latter case the number of possible ways of establishing a link between the local exchange 404 and the intermediate telecommunications site 801 is 10. This is greater than the number of permutations from local exchange 401 to intermediate telecommunications site 601, which is 9. The intelligent algorithm then performs a comparison of these two numbers and works out which end of the overall plan requires the least number of possible connections to evaluate in order to make the next step along a path. In this case the local exchange 401 has the least number of permutations and so the algorithm attempts to make a connection between the local exchange 401 and a next node in the path that may be within the local exchange 401 itself or alternatively in the intermediate telecommunications site 601. The details of this evaluation process will be described later.

The intelligent algorithm proceeds by establishing the next link along a path and then evaluating the number of possible links to the next telecommunications node. This number is then compared with the already known number of permutations working from the other end of the overall plan. FIG. 8 shows the stage when the algorithm has made continuous progress to the main connection node in the network interconnect site 402, having established suitable connections for the link between the local exchange 401 and the network interconnect site 402.

Movement from A to B in this way has stopped at the point shown in FIG. 8, as the number of permutations of the links from the central node of the network interconnect site 402 to the next nodes in the path are greater than ten, and thus it is now possible for the algorithm to switch to working from the local exchange 404 in the direction of site A. The intelligent algorithm proceeds from the direction where there are the least number of connection permutations towards the direction from which the largest number of connection permutations emanate, thus maintaining the highest degree of computational efficiency, while at the same time ensuring the maximum probability that both ends of the search will meet at some point in the middle. Operation in this way ensures that the probing search is always towards the largest target.

An explanation of the intelligent searching algorithm requires the definition of a small number of variables, which are as follows:

| | | |
|---|---|---|
| f' | = | estimate of the cost of the link from A to B. |
| g | = | known cost of the link from A to the currently considered telecommunications node. |
| h' | = | estimate of the cost of the link from the currently considered telecommunications node working from left to right, to the target node, which is the most recently considered telecommunications node working from right to left. |
| h | = | known cost of the link from B to the target node. | f' = g + h' + h where the prime of the h' denotes a heuristic component, which will be described in detail later. These variables are defined for use in the search process from left to right. The same variables, but having different values, are used when searching in the reverse direction.

Figure 9A:
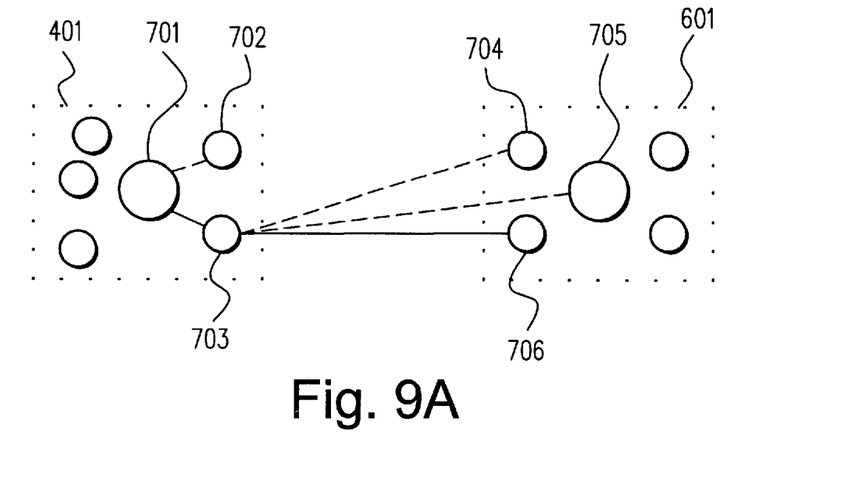

The first step of the intelligent search algorithm is shown in FIG. 9A. Data contained within the routing file 303 indicates to the intelligent searching algorithm that two digital distribution frames, or nodes as these will henceforward be called, are suitable for carrying the type of link that is required from A to B. These nodes, 702 and 703, are evaluated individually for their suitability for carrying the link. This is done by applying the formula to each of the nodes 702 and 703 individually. Thus the formula f'=g+h'+h is evaluated firstly for node 702. In this case g is a measurement of the cost of the link between the initial node 701 and the currently considered node 702; h is currently zero because there has been no progress from right to left as shown in FIG. 8; and the value h' is calculated according to a heuristic evaluation, giving an indication of the likely cost of linking node 702 to the connection at the local exchange 404 on the right of FIG. 8. Once this formula has been applied, the value for f' for node 702 is stored. The same formula is then applied to node 703, and a comparison of the resulting f' values is made such that the node with the lowest value for f' is now considered for subsequent connection to the next telecommunications site 601 in the path.

Data held within the routing file 303 indicates to the intelligent searching algorithm that there are three possible ways of connecting to the telecommunications site 601 from node 703. These include connection from node 703 to node 704, node 703 to node 705, and node 703 to node 706. Each of the nodes 704, 705 and 706 is considered by applying the formula f'=g+h'+h in the manner that has been previously described for nodes 702 and 703, in order to evaluate the most promising route for an efficient link within the estimated cost of the entire link from A to B.

Three different f' values are generated by applying the formula f'=g+h'+h to each of the three nodes 704, 705 and 706, and the three resulting f' values in addition to the f' value for node 702 are compared against each other, and the minimum f' value indicates the most promising node for consideration. Thus, while at this stage in the intelligent search the link from node 703 to node 706 turns out to be the most promising connection, it is possible that node 702 may eventually provide a better solution when additional connections are considered.

Figure 9B:
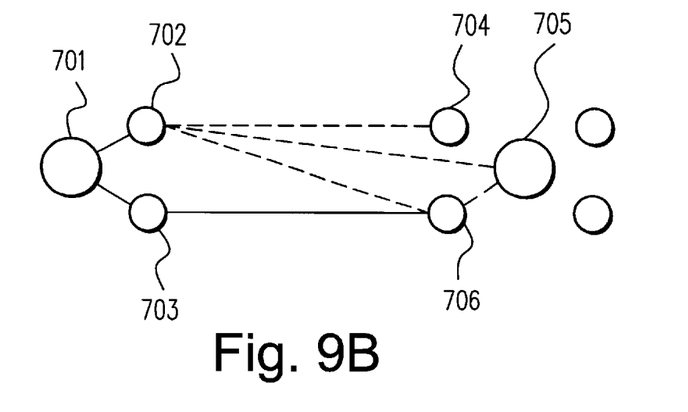

This situation is shown in FIG. 9B, where the f' value for connecting node 706 to node 705, turns out to be greater than the f' value for connecting node 702 to any of nodes 704, 705 and 706. Of the possible node connections, it turns out that the f' value for the connection between node 702 and node 706 is actually less than the f' value for the connection of the previously considered path along nodes 701, 703, 706 to 705.

Figure 9C:
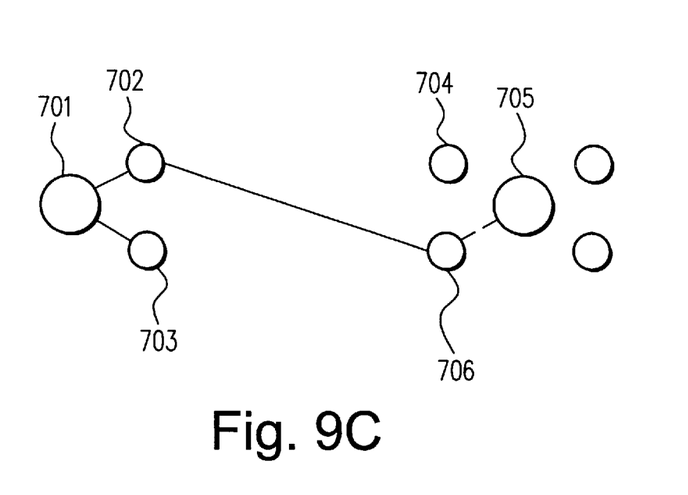

FIG. 9C shows the natural progression resulting from this, with node 702 taking over the connection to node 706 from where a subsequent connection is now being considered to node 705. Thus a promising initial route shown in FIG. 9A turns out to be less efficient in the long run than an initially less promising route through nodes 701, 702 and 706. Each of the nodes connected along a route is assigned pointers to previous and next nodes so that when a successful route across the network has been found, it is possible to work backwards through connected nodes in order to determine the connections that have to be made. In FIG. 9C node 706 points back to node 702 and thus its backwards pointer no longer points to node 703: this is a process known as pruning.

Referring back to FIG. 8, while nodes are connected moving from left to right or from A to B, and no progress has been made from right to left or from B to A, the value of h is set at zero. Thus the estimated cost of connecting the currently considered node working from the left to the main node in local exchange 404, may be a fairly inaccurate approximation of the actual cost. However as the algorithm proceeds to connect up more nodes and progress is also made from right to left, the known cost h of getting from the main node in local exchange 404 to the most recently considered node, working from the right, increases in magnitude and h' reduces in magnitude.

Thus, the overall procedure consists of identifying the best path between a first node and a second node. A procedure is provided for establishing a path through links and this procedure may be implemented starting from node A or from node B. Consequently, prior to implementing the node searching, a routine is performed to establish a preferred starting point, based on the number of links connected to that node. Once a preferred starting point has been identified, the second procedure is implemented in order to identify the next preferred node for a preferred connection. At this point, the whole process may be repeated. Thus, a link may have been identified connecting the first node to a third node. Alternatively, using the procedure, a link may have been established from the second node to a third node. This third node may now be considered as a primary node, that is to say, if it is connected to the original first node the third node may be treated as a new first node. Similarly, if the third node is connected to the second node, the third node may be treated as a new second node. Thus, the new problem is familiar in that it is similar to the previous problem, that is, establishing a connection between a first node and a second node. Thus the initial procedure is repeated in order to determine the best starting point. Thus the direction from which the routing procedure is effected may alternate until, eventually, the route connects and a preferred path is fully identified.

A further feature of the intelligent search algorithm is that before each node is evaluated using the formula f'=g+h'+h, it is checked to see that it is not a node that is connected by the links generated from the opposite side of the search. If this is the case, the search procedure is over and the full set of connections for the link from A to B is generated by reading the pointers in each service node, working left and right through the linked list of service nodes.

Efficient operation of the intelligent search algorithm requires that the estimated cost h', of the unknown links, is less than or equal to the actual cost that eventually emerges. In order to achieve this a careful balancing of several costing factors must be achieved, these factors being:

1. The distance from the initial node on the current side of the search.
2. The distance from the initial node on the other side of the search.
3. The distance covered by the link being considered.
4. The number of nodes used to reach the currently considered node.
5. The capacity of the current node.
6. The telecommunications medium used by the current node.

Each of these factors needs to be carefully adjusted in order to optimise performance of the algorithm. Each factor may be weighted by a finely tuneable constant, which may be adjusted as a result of simulations, or even as part of an ongoing optimising and fine tuning process, after the algorithm has been put into service.

The first embodiment relates to a telecommunications network which is capable of being re-routed under the control of a centralised computer monitor, which performs the network state monitoring 202. In many mixed technology networks, however, many communications nodes may be incapable of being reconfigured under computer control. Thus, a second embodiment is arranged to be applicable to such a network and the algorithm that has been described may still provide considerable advantage. The results of automatic routing 203 may be produced in the form of a computer printout sent to several telecommunications nodes between sites A and B. Personnel at each of the telecommunications nodes between sites A and B will be aware that their knowledge of the local hardware has been used in the form of encoded data in a routing file 303, and are therefore likely to accept the solution generated by the automatic routing procedure. If they do not accept the results and consider them to be inefficient, a complaint may be made and the automatic routing procedure may be optimised by modifying data in the routing file for that particular telecommunications node, or adjusting the weighting of the constants used in the heuristic function h' that is part of the core routing algorithm. Thus automatic routing provides an advantage because it provides a mechanism for imposing a solution on subordinate divisions of a larger telecommunications company, without such a solution being perceived as ignoring the knowledge and the skills of local telecommunications workers. Furthermore, this technique avoids the need for inter-departmental communication and possibly conflict that may arise when generating a routing plan manually.

What is claimed is:

1. A method of identifying preferred paths for traffic in a communications network, said paths having transmission links and reconfigurable switching nodes, said method comprising the steps of:

processing a first set of data relevant to paths starting from a first node, said paths being intended for the purpose of providing communication towards a second node;

processing a second set of data relevant to paths starting from said second node, said paths being intended for the purpose of providing communication towards said first node; and comparing said sets of data to establish whether further steps to identify said preferred path should start from said first node or from said second node.

2. A method as in claim 1, wherein:

said first set of data and said second set of data each include the number of potential links which could form part of the path to which the data is relevant.

3. A method as in claim 2, wherein:

said comparison step includes comparing said number of links connected to each of the said first node and said second node, such that the node having the fewer number of links is selected as a starting node.

4. A method as in claim 1 wherein:

said further steps include a heuristic procedure to identify a third node connected via a link to either said first node or to said second node.

5. A method as in claim 4, wherein:

said third node is treated as a new first node if connected to said first node or is treated as a new second node if connected to said second node, whereafter said method of identifying a preferred path between the new node and the previously considered node is again performed.

6. A method as in claim 1 further comprising the step of:

configuring the network such that a communication instance arising in the network is routed according to an identified preferred path.

7. Apparatus for identifying preferred paths for traffic in a communications network, said paths having transmission links and reconfigurable switching nodes, the apparatus comprising:

processing means for processing a first set of data relevant to paths starting from a first node to provide communication with a second node, and for processing a second set of data relevant to paths starting from said second node, said paths being intended for the purpose of providing communications towards said first node, and comparing means for comparing said sets of data to establish whether further steps to identify said preferred path should start from said node or from said second node.

8. Apparatus as in claim 7, wherein:

said first set of data and said second set of data processed by said processing means each include the number of potential links which could form part of a preferred path.

9. Apparatus as in claim 8, wherein:

said comparing means compares said number of links directly connected to each of said first and second nodes and selects the node having the fewer number of links as a starting node.

10. Apparatus as in claim 7 including:

means for effecting said further steps, including means for performing a heuristic procedure to identify a first link connecting either said first node to a third node or said second node to a third node.

11. Apparatus as in claim 9, wherein:

said third node is treated as a new first node if connected to said first node or is treated as a new second node if connected to said second node, and said apparatus further comprising apparatus for identifying a preferred path between said new nodes.

12. Apparatus as in claim 7, further comprising:

means for configuring the communications network such that it provides an identified preferred path to a communications instance arising in the network.

13. A method of identifying preferred paths for traffic in a communications network between first and second terminal nodes, said paths having transmission links and reconfigurable switching nodes, said method comprising the steps of:

i) processing data relevant to paths emanating in a first direction from said first terminal node towards said second terminal node;

ii) processing data relevant to paths emanating in a second direction from said second terminal node towards said first terminal node;

iii) comparing the results of steps i and ii to determine which of said first and second directions is best suited for use in determining a next transmission link in a given path;

iv) determining a next transmission link in a given path in the best suited direction as determined in step iii; and v) repeating steps i through iv to identify a preferred path of transmission links between said first and second transmission nodes.

14. Apparatus for identifying preferred paths for traffic in a communications network between first and second terminal nodes, said paths having transmission links and reconfigurable switching nodes, said apparatus comprising:

i) means for processing data relevant to paths emanating in a first direction from said first terminal node towards said second terminal node;

ii) means for processing data relevant to paths emanating in a second direction from said second terminal node towards said first terminal node;

iii) means for comparing the results of means i and ii to determine which of said first and second directions is best suited for use in determining a next transmission link in a given path;

iv) means for determining a next transmission link in a given path in the best suited direction as determined in means iii; and v) means for repeating the operation of means i through iv to identify a preferred path of transmission links between said first and second terminal nodes.

15. A method of establishing an end-to-end route for traffic between a source node and a destination node in a communications network, the route comprising transmission links and reconfigurable switching nodes, wherein the source node and the destination node constitute initial current part route end nodes of the route to be established; the method comprising:

i) determining in accordance with a predetermined part route end node selection algorithm at which of the two current part route end nodes of the route to be established a predetermined link selection algorithm is to be performed;

ii) determining a transmission link to be a route component by selection in accordance with that predetermined link selection algorithm from a set of relevant transmission links emanating from the current part route end node determined by step i), the reconfigurable switching node at which that determined transmission link terminates thereby becoming a current part route end node of the route to be established in place of the node from which that determined transmission link emanates; and iii) iterating steps i) and ii) until a transmission link determined by step ii) terminates at the other current part route end node of the route to be established thereby establishing that route.

16. A method of establishing an end-to-end route for traffic between a source node and a destination node in a communications network, the route comprising transmission links and reconfigurable switching nodes, wherein the source node and the destination node constitute initial current part route end nodes of the route to be established; the method comprising:

i) determining in accordance with a predetermined part route end node selection algorithm at which of the two current part route end nodes of the route to be established a predetermined link selection algorithm is to be performed, the predetermined part route end node selection algorithm comprising the substeps of, i.i.) ascertaining for each of the current part route end nodes the respective numbers of relevant transmission links emanating therefrom, and i.ii) selecting the current part route end node having the lower number of said emanating transmission links;

ii) determining a transmission link to be a route component by selection in accordance with that predetermined link selection algorithm from a set of relevant transmission links emanating from the current part route end node determined by step i), the reconfigurable switching node at which that determined transmission link terminates thereby becoming a current part route end node of the route to be established in place of the node from which that determined transmission link emanates; and iii) iterating steps i) and ii) until a transmission link determined by step ii) terminates at the other current part route end node of the route to be established thereby establishing that route.

* * * * *